United States Patent [19]

Ikami et al.

[11] Patent Number: 5,675,832
[45] Date of Patent: Oct. 7, 1997

[54] DELAY GENERATOR FOR REDUCING ELECTROMAGNETIC INTERFERENCE HAVING PLURALITY OF DELAY PATHS AND SELECTING ONE OF THE DELAY PATHS IN CONSONANCE WITH A REGISTER VALUE

[75] Inventors: Shinichi Ikami, Yamato; Takeshi Asano, Atsugi, both of Japan

[73] Assignee: International Business Machines Corporation, Armonk, N.Y.

[21] Appl. No.: 412,047

[22] Filed: Mar. 28, 1995

[30] Foreign Application Priority Data

Apr. 26, 1994 [JP] Japan .................................. 6-088454

[51] Int. Cl.$^6$ .................................. G06F 13/00
[52] U.S. Cl. ................ 395/835; 395/309; 395/858; 395/559; 395/882; 327/261; 327/262; 327/277; 327/294; 348/537; 348/711; 348/720
[58] Field of Search ..................... 327/262, 277, 327/278, 294; 348/537, 714, 711, 720; 364/784; 365/194; 371/27; 375/360; 395/309, 559, 835, 858, 882

[56] References Cited

U.S. PATENT DOCUMENTS

| | | | |
|---|---|---|---|
| 4,649,427 | 3/1987 | Tsushima | 348/714 |
| 4,737,670 | 4/1988 | Chan | 348/537 |
| 4,864,401 | 9/1989 | Kawata et al. | 327/278 |
| 5,013,944 | 5/1991 | Fischer et al. | 327/277 |
| 5,014,286 | 5/1991 | Ransijn | 375/360 |
| 5,189,635 | 2/1993 | Ohki | 364/784 |
| 5,191,245 | 3/1993 | Kang | 327/262 |
| 5,280,195 | 1/1994 | Goto et al. | 327/294 |
| 5,305,329 | 4/1994 | Sasaki | 371/27 |
| 5,406,518 | 4/1995 | Sun et al. | 365/194 |
| 5,424,590 | 6/1995 | Sato et al. | 327/273 |
| 5,467,041 | 11/1995 | Baba et al. | 327/276 |
| 5,534,808 | 7/1996 | Takaki et al. | 327/261 |

Primary Examiner—Thomas C. Lee
Assistant Examiner—Po C. Huang
Attorney, Agent, or Firm—Marc A. Ehrlich

[57] ABSTRACT

It is an object of the present invention to restrict EMI radiation at a specific frequency by inserting a delay time that is effective for that frequency. The feature of the present invention is to provide a delay generator that can selectively alter delay times. The delay generator comprises: delay means, which is connected to a plurality of data input lines, and which has a plurality of delay paths for the generation of a plurality of alternative delay times; a register for storing a digital value of pre-determined bit; and selection means for selecting one of the delay paths in consonance with the digital value and for providing the selected delay path for the signal lines.

5 Claims, 5 Drawing Sheets

DELAY GENERATOR FOR REDUCING ELECTROMAGNETIC INTERFERENCE HAVING PLURALITY OF DELAY PATHS AND SELECTING ONE OF THE DELAY PATHS IN CONSONANCE WITH A REGISTER VALUE

FIELD OF THE INVENTION

The present invention relates to the reduction of electromagnetic interference radiation in a computer system.

DESCRIPTION OF THE PRIOR ART

Currently, as the speed of liquid crystal display (LCD) interfaces has increased, there has been a corresponding increase in the speed, and in the width, of LCD video busses. Consequently, a problem has arisen, especially recently, with EMI radiation, which is produced by an interface circuit with a large bus structure and which increases in proportion to the number of buses. Since an interface cable usually connects an LCD bus to an LCD module, the EMI radiation along this bus has a great influence on the functions of an entire system. The maximum EMI radiation occurs when all the data lines of a bus carry the identical waveform data. An LCD video interface provides a specific example of this. Since the data carried by the data lines of an LCD video interface correspond to luminescences, the above phenomenon frequently occurs when the video data are for the display of the maximum luminescence.

With a view to countering the effects of the EMI phenomenon, filters have conventionally been employed with each bus. This conventional EMI countermeasure method, however, raises manufacturing costs, because many busses are usually employed and a part, such as a filter, is required for each bus data line. In addition, since mounting space on a printed board is required, the cost of the board is also increased.

To overcome the shortcomings, a predetermined delay is conventionally added to a signal to reduce the interference that occurs due to electromagnetic waves, etc. In the study reported in, "Expression that uses the sum of the noise components included in electromagnetic noise irradiated by a digital circuit board," by Kosaka et al., (The Institute of Electronics, Information and Communication Engineers, Technical Report 91–61), a delay was inserted into a signal to reduce the radiation of noise. In addition, as a countermeasure for voltage noise in LSI circuits, delays have been used to avoid simultaneous bus shifts and to thus reduce board voltage noise.

In the study report, however, although the effect obtained when a delay was inserted is described, the relationship between the frequency for which EMI radiation is effectively restricted and the length of a delay is not apparent; merely the fact that the insertion of a delay restricted the EMI radiation is reported. In other words, from the study report it could not be determined which delay time lengths, which were inserted into data transmitted at specific frequencies, were required to effectively restrict EMI radiation. This is also not available as regards conventional large scale integration (LSI) voltage noise countermeasures.

When the EMI measurements determined during the planning stage for a personal computer and during the prototype stage are compared with the EMI measurement for a device that is actually to be shipped, it is not uncommon to find that EMI occurs at a frequency that differs from the anticipated one. Therefore, sometimes the length of the delay, as determined via EMI measurements taken during the planning and prototype test phase, is insufficient for effective reduction of the EMI of the final product. Since hardware can not normally be altered at the time of shipment, it is impossible to avoid using the delay time length that was determined during the planning stage, or by the use of the prototype, even though the delay time does not sufficiently reduce the EMI of a final product.

SUMMARY OF THE INVENTION

It is an object of the present invention to reduce EMI radiation in a final product by identifying the relationship between a frequency at which EMI radiation occurs and a delay time.

According to the present invention, an alterable delay time is employed. Thus, a delay time that adequately reduces EMI can be selected in consonance with the result of the EMI measurement determined for a final product. In the preferred embodiments, a delay generator comprises: delay means, which is connected to a plurality of input data lines, and which has a plurality of delay paths to enable the generation of a plurality of alternative delay time lengths; a register for storing a digital value of pre-determined number of bits; and selection means for selecting one of the delay paths in consonance with the digital value and providing the selected delay path among signal lines, so that the delay time can be changed by software that rewrites the digital value.

DESCRIPTION OF THE PREFERRED EMBODIMENT

Figure 1:
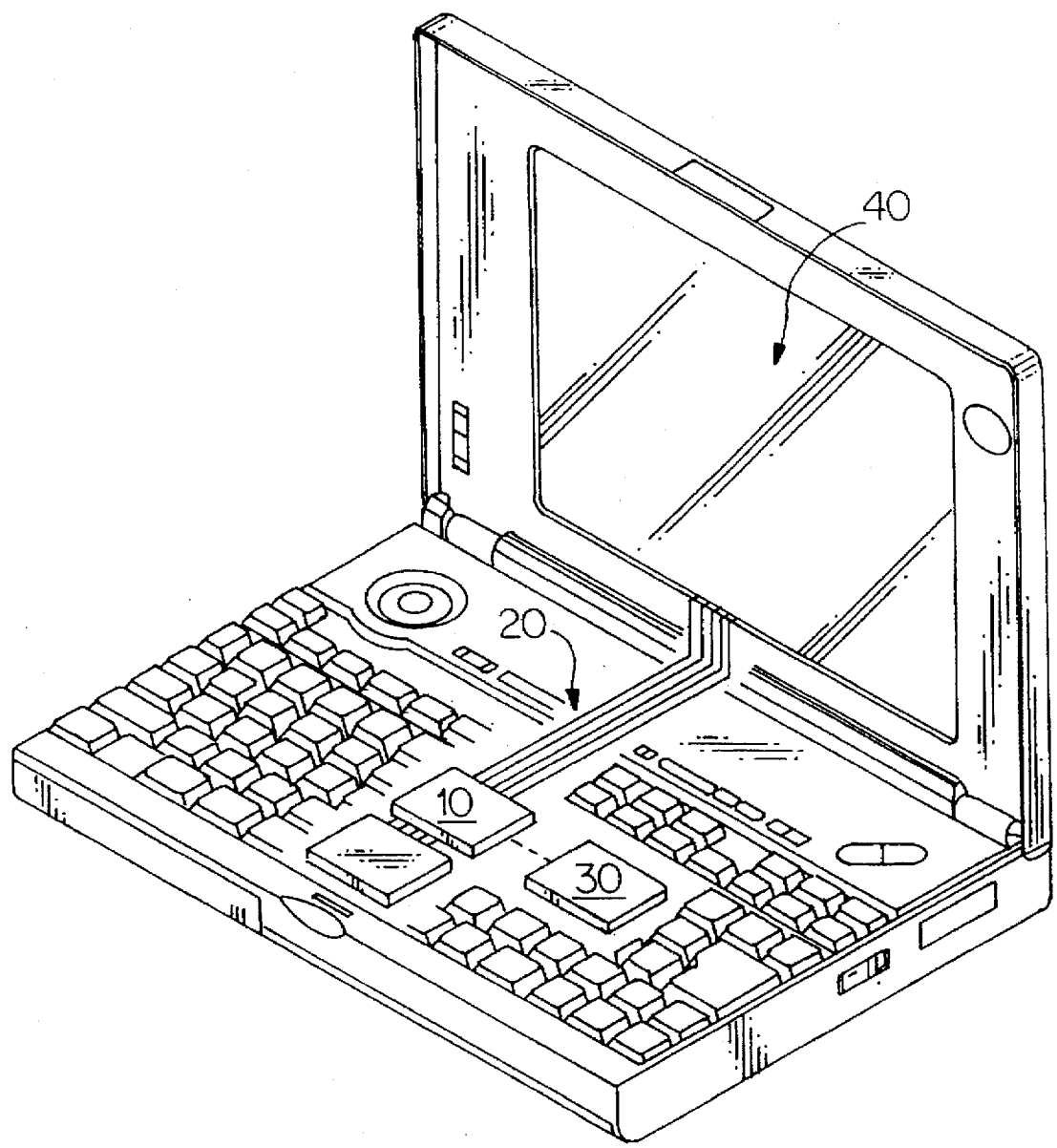
FIG. 1 is a diagram illustrating a data processing system that includes a delay generator according to the present invention.

Referring now to FIG. 1, FIG. 1 is a diagram illustrating a data processing system that incorporates a delay generator 10 according to the present invention. Part of the display data, which is output to an LCD 40, is transmitted via the delay generator 10 and over data lines 20. When the length of the delay that is produced in the delay generator 10 does not exceed the timing specs for the LCD 40, no alteration of the LCD 40 is required. If the required length of the delay exceeds the specs, means for compensating for the delay (not shown) is provided for the LCD 40 and correct data is acquired and displayed.

The relationship between a delay time and the frequency at which the EMI is effectively reduced by the delay will now be described, and the arrangement of the present invention according to that relationship will be explained in detail.

Figure 2:
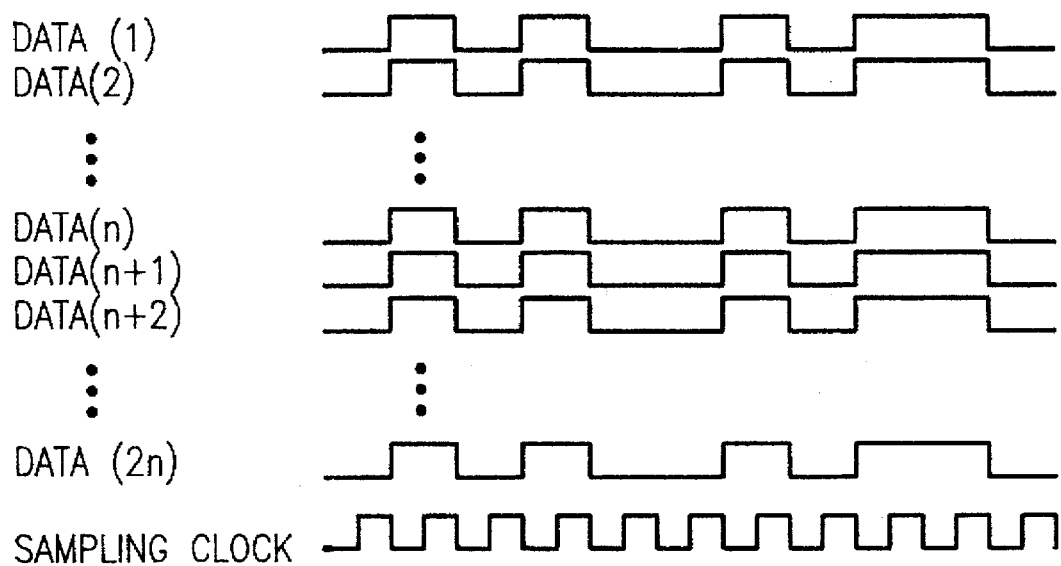
FIG. 2 is a diagram showing an interface where the timing for the operation of 2n data lines is identical.

In an interface that includes 2n data lines and a sampling clock, all of the data lines are operated at the same timing, as shown in FIG. 2. When a delay is inserted into half the data lines, i.e., n data lines, EMI radiation due to the data transmitted along the data lines is acquired by expression (1)

$$\sqrt{1+\cos(2\pi td/Tf))/2} < 1 \quad \text{[Expression 1]}$$

from the results of spectral analysis:

$$\frac{Ed(f)}{E(f)} = \frac{1+\cos(2\pi td/Tf)}{2} \quad \text{[Expression 2]}$$

Figure 3:
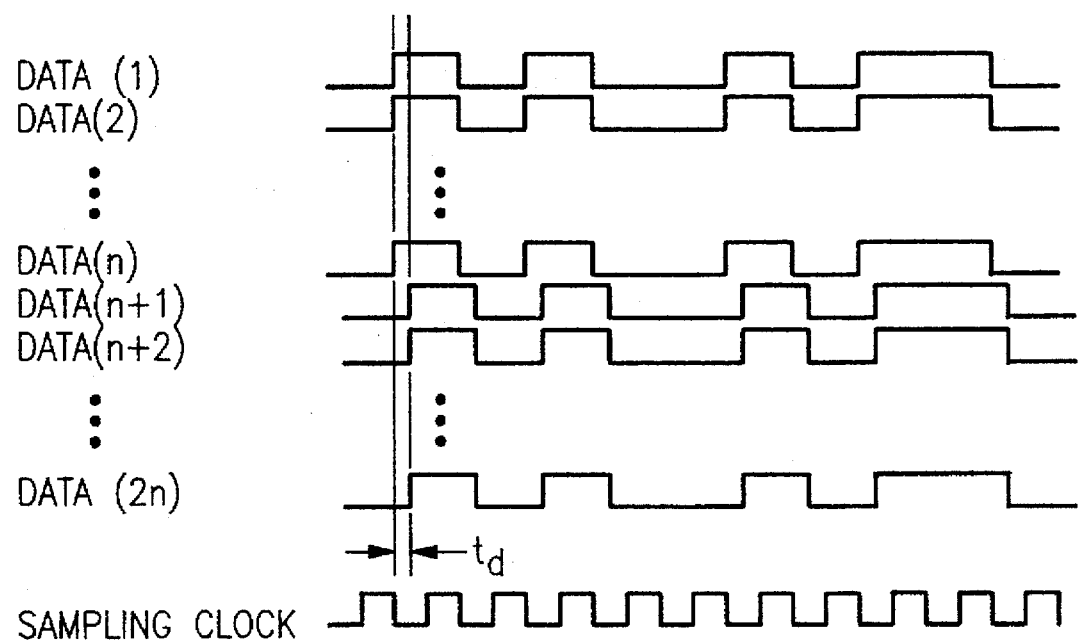
FIG. 3 is a diagram showing an interface where delay time td is inserted into n data lines of a total 2n data lines.

In this expression, Ed(f) denotes the amount of EMI radiation at frequency f when, as is shown in FIG. 3, delay td is inserted into n data lines, which is half of the available 2n data lines; its unit is Volt/Meter. E(f) denotes the amount of EMI radiation in a conventional, general interface system, i.e., when a delay is not inserted. Tf denotes a cycle of a frequency that is observed as EMI radiation, and td denotes a delay time that is inserted into a circuit.

Figure 4:
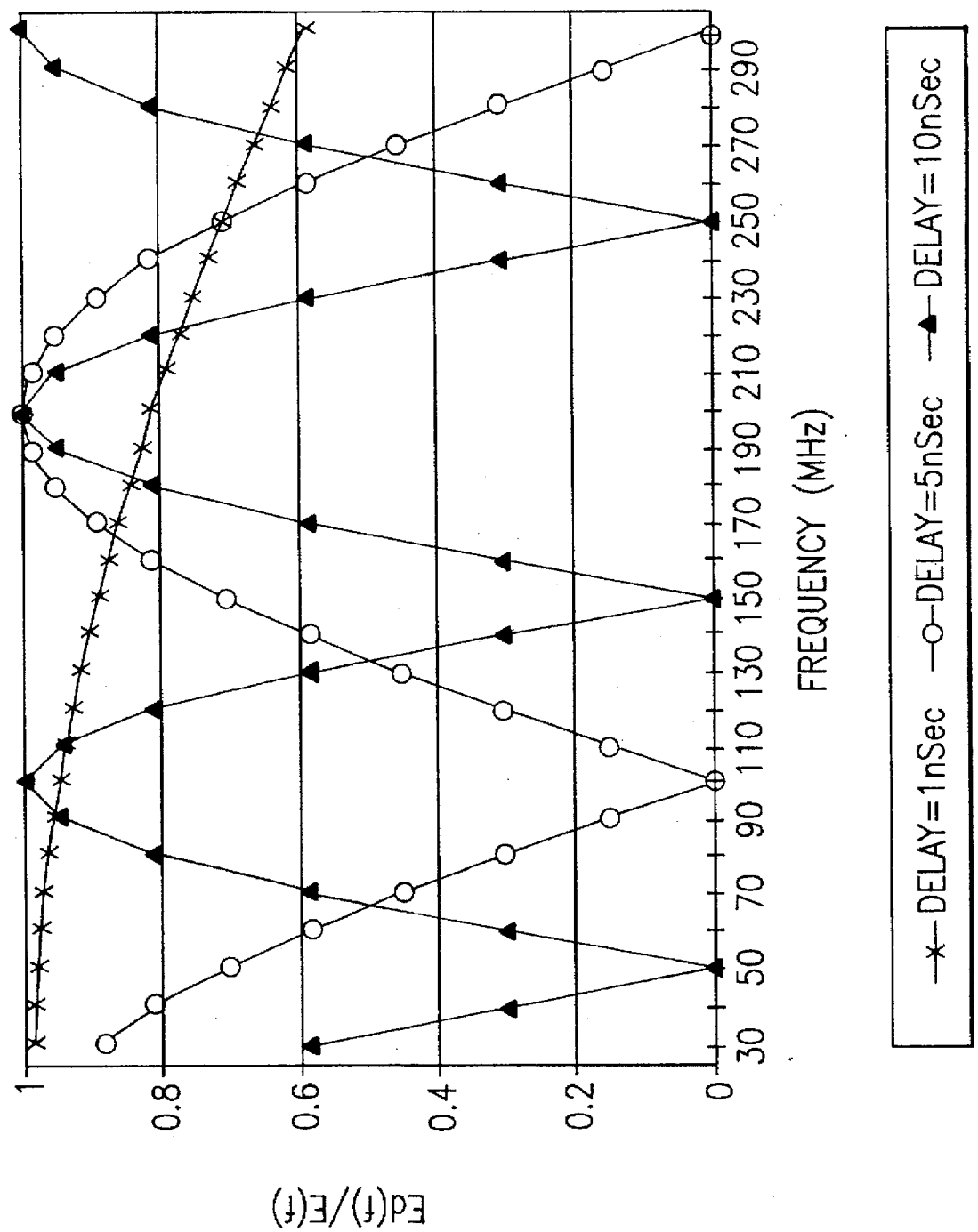
FIG. 4 is a graph showing a change in Ed(f)/E(f) according to a delay time.

From the result obtained by expression (1), a change in Ed(f)/E(f) when the length of the delay is altered is shown in FIG. 4. As is apparent from this graph, it is possible to adjust the effects so as to restrict the EMI radiation to a specific frequency f by controlling the delay. More specifically, as is apparent from expression (1), when delay time td is integer times greater than cycle Tf of frequency f for an EMI in question, the effect of the restriction is the minimum, zero. When the inserted delay time td is half an integer times as great as cycle Tf of the frequency, i.e., ½, ³⁄₂, ..., radiation from the data line is completely restricted. Further, it is evident, when compared with the amount of radiation when there is no delay inserted, that there is no increase in the amount of radiation when a delay is inserted.

It is apparent from the above described results that the frequencies that can effectively reduce the reduction of the EMI radiation vary. Therefore, even when during the planning and test phase, a delay time is set in consonance with a frequency for which EMI countermeasure is required, if EMI occurs at a different frequency during the shipping or the system manufacturing stage, it is necessary to insert a delay that is effective at the new frequency for which the EMI countermeasure is required. Since hardware cannot be changed at this stage, a software change is desirable.

Figure 5:
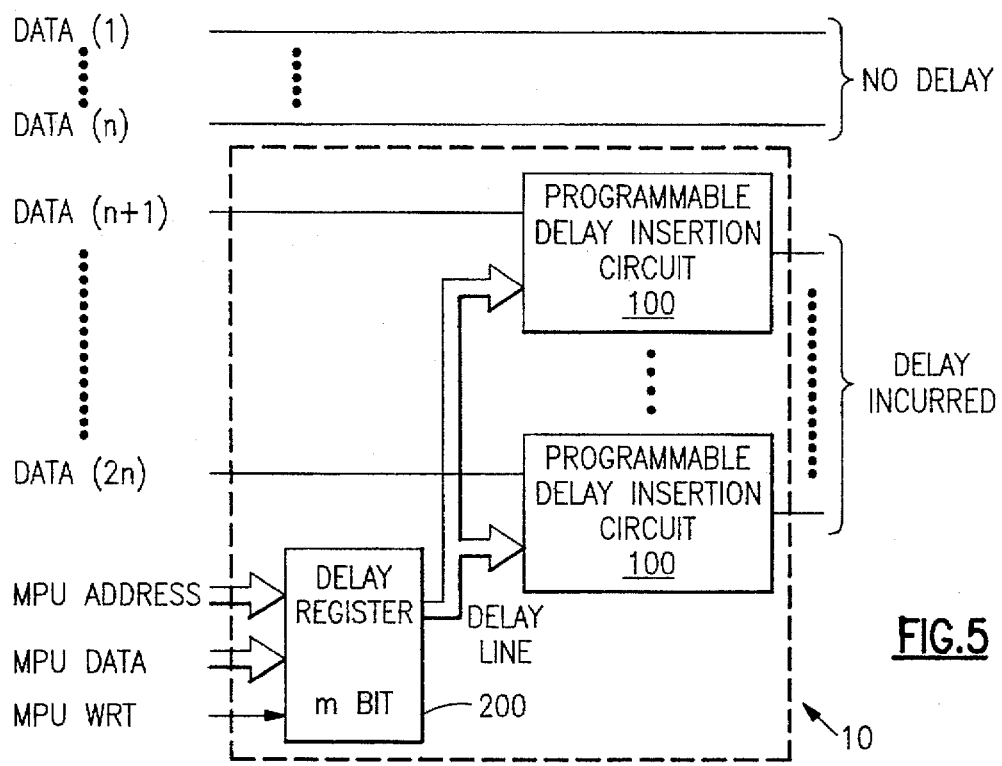
FIG. 5 is a diagram illustrating a delay generator, according to the present invention, that can alter a delay time.

FIG. 5 shows the circuit structure of the delay generator 10 of the present invention. Of the 2n data lines that consist of data (1) to data (2n), a delay circuit is connected to half of those data buses, or n, that consist of data (n+1) to data (2n). A delay value register 200 is a common m-bit data register, and the value of a delay time held by the register can be set and changed by software under the control of the connected microprocessor unit (MPU) (30 in FIG. 1). Programmable delay insertion circuits 100 add to a data signal a delay time that corresponds to the value obtained by the delay value register 200.

Figure 6:
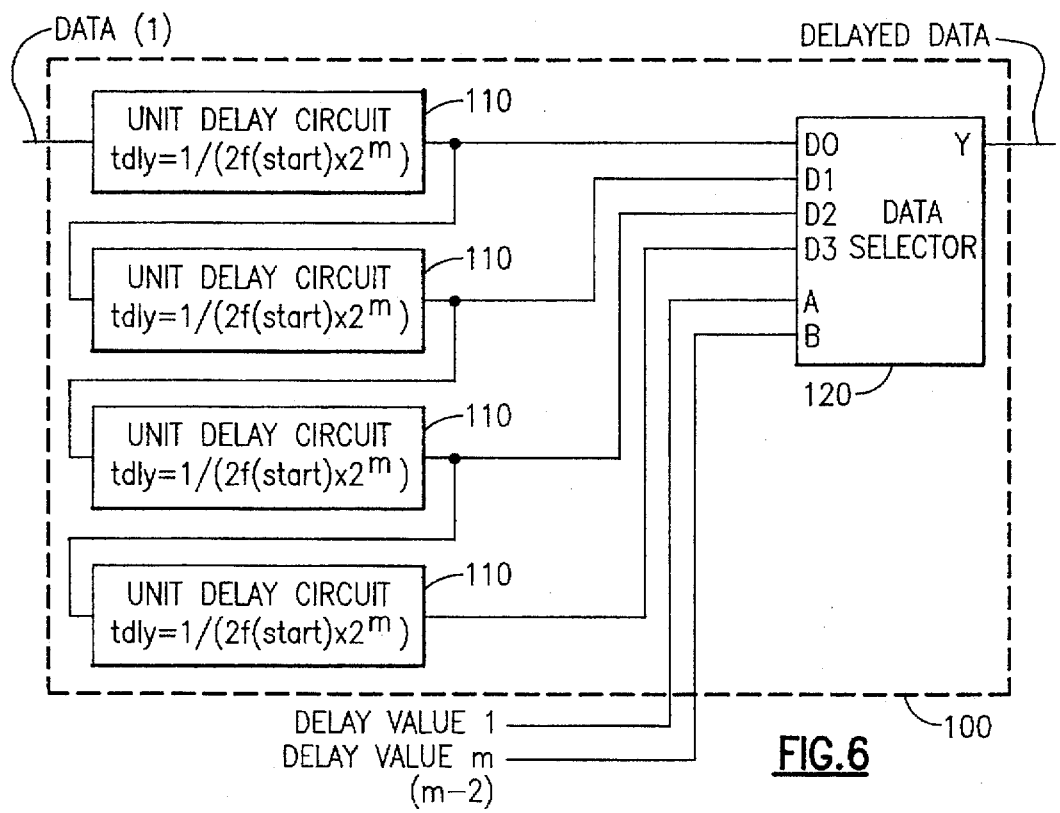
FIG. 6 is a diagram showing the arrangement of a programmable delay insertion circuit.

FIG. 6 illustrates the example arrangement of the programmable delay insertion circuit 100. Suppose that a delay that can effectively restrict the EMI radiation is to be inserted at a frequency at f(start) or higher. As is apparent from expression (1), the minimum value of the delay time that will provide the maximum restriction effect at the frequency f(start) is half of cycle 1/f(start) of the frequency. Thus, a delay time Tdlymax for 1/{2*f(start)} is required at the minimum ("max" in "Tdlymax" means the maximum effect.). In addition, as is easily understood from expression (1), for frequencies f(start) or higher the maximum restriction effect is ensured by using a shorter delay time than the delay time Tdlymax, so that the selection of a delay time of from 0 to Tdlymax can be made.

Unit delay circuits 110 in FIG. 6 insert a delay time Tdlyunit=Tdlymax/2m. Specifically, a number of inverters are connected to construct such a circuit. 2m of the unit delay circuits 110 are connected in series, as is shown in FIG. 6, to prepare data that hold the delay values Tdlyunit, 2*Tdlyunit, ..., Tdlymax=(2**m)*Tdlyunit. Then, a delay time that corresponds to a value sent from a delay value register, delay value 1, ... delay value m, is selected by a data selector 120. With this arrangement, the programmable delay circuit 100 can insert an appropriate delay time into data.

Figure 7:
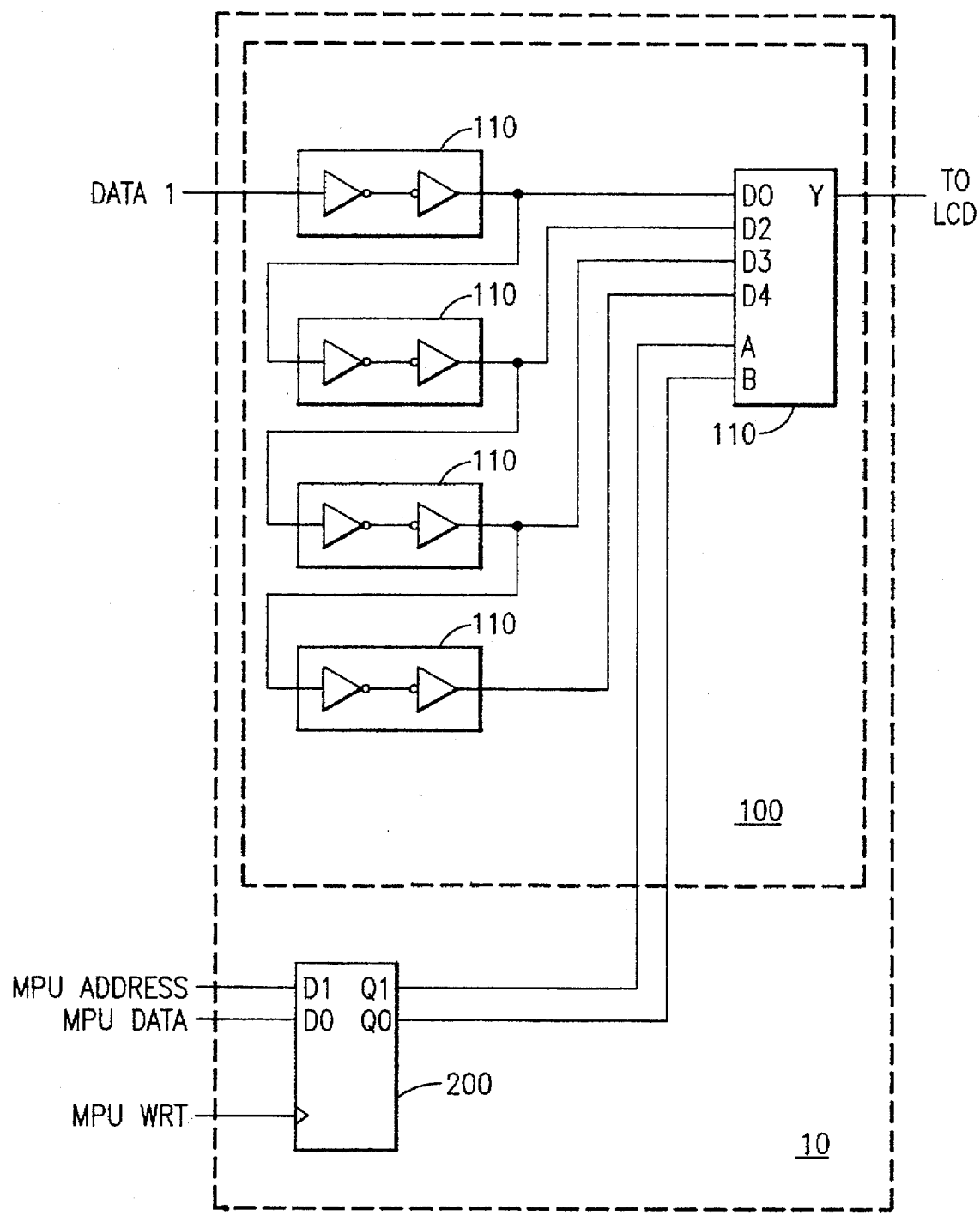
FIG. 7 is a delay generator wherein inverters are employed for unit delay circuits.

FIG. 7 illustrates an embodiment of a delay generator where inverters are employed as unit delay circuits. When an individual inverter pair provides a 1ns delay, the circuit in FIG. 7 can provide four different delays, from 1ns to 4ns, in consonance with the value held by the delay value register.

Although in the embodiment the circuit is designed so it can provide four different delay times, the number of delay times is optional and is thus not limited. The number of buses used for delay is not necessarily half of the total buses; the number can be adjusted. It should be noted that the configuration in this case is not effective for radiation from extra buses, aside from those busses along which delays are not provided and the number of which is equivalent to that of the buses along which a delay is provided, but as a whole, the radiation from the buses can be effectively reduced. A dip switch, etc., can be used to select a delay time. Further, an EMI detector is located near a bus where EMI occurs, and a feedback system is provided and connected to an MPU. Thus, the design can be such that in accordance with the EMI detection result, a delay time that provides the maximum effect is automatically selected by a command from an MPU.

As described above, according to the present invention, EMI radiation can be reduced in a final product.

Having thus described our invention, what we claim as new and desire to secure by Letters Patent is as follows:

1. A delay generator, which is located along a plurality of signal lines, for selectively providing an alterable delay time for signals transmitted on said plurality of signal lines, said alterable delay time being the same on each of said plurality of signal lines, wherein said alterable delay time is set by said delay generator to reduce electromagnetic interference within a product based upon an electromagnetic interference measurement for said product, said delay generator comprising:

delay means, connecting a plurality of data input lines and having a plurality of delay paths for the generation of alternative delay times;

a register for storing a digital value that is held by a predetermined number of bits; and selection means for selecting and thereafter providing one of said plurality of delay paths for provision of said alterable delay time on said plurality of signal lines in consonance with said digital value.

2. A data processing system comprising:

an input/output device;

a microprocessor unit; and a delay generator according to claim 1, located along said plurality of signal lines wherein said plurality of signal lines are connected to said input/output device.

3. A data processing system according to claim 2, wherein said selection means selects one of said delay paths that is rewritable by said microprocessor unit.

4. A data transfer system comprising:

transmission means, including a delay generator according to claim 1 which provides an alterable delay time for a signal transmitted by said transmission means; and reception means, including compensation means which receives said signal from said transmission means and compensates for said alterable delay time provided by said transmission means.

5. A delay generator according to claim 1, which intersects said plurality of signal lines and selectively provides an alterable delay time for insertion into signals transmitted on said plurality of signal lines, and whereby is provided, for said alterable delay time that is selected, a value that satisfies the following expression:

$$\sqrt{1+\cos(2\pi t_d/T_f)/2} < 1 \qquad \text{[Expression 1]}$$

where $t_d$ denotes said provided delay time, and $T_f$ is a frequency cycle observed as electromagnetic interference radiation based upon said electromagnetic interference measurement for said product.

\* \* \* \* \*